Figure 3:
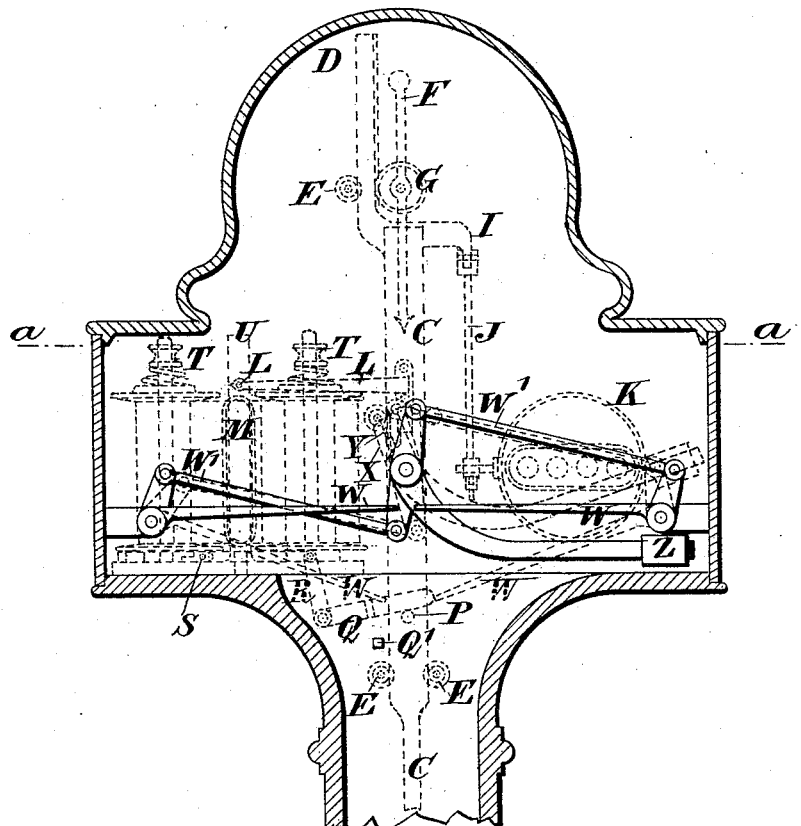

(No Model.) 2 Sheets—Sheet 1.
E. H. BECKETT & C. W. ROBERTS.
AUTOMATIC WEIGHING MACHINE.
No. 527,828. Patented Oct. 23, 1894.
Fig: 1. 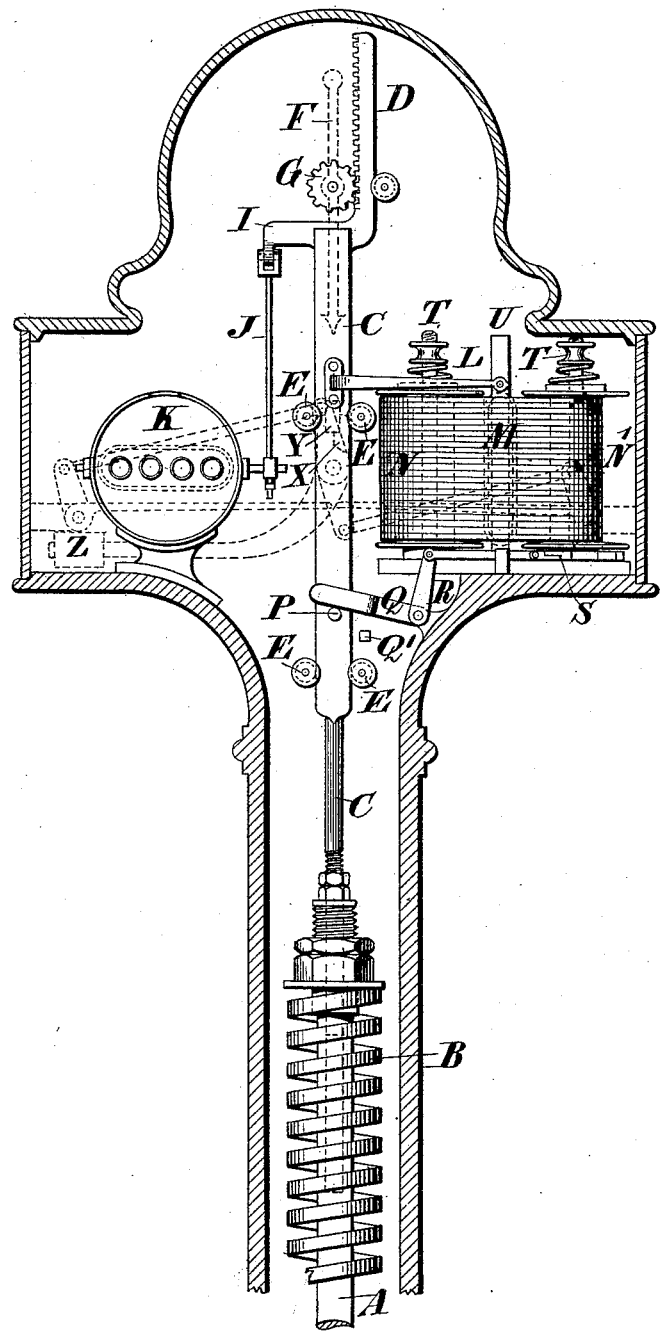
Fig: 2. 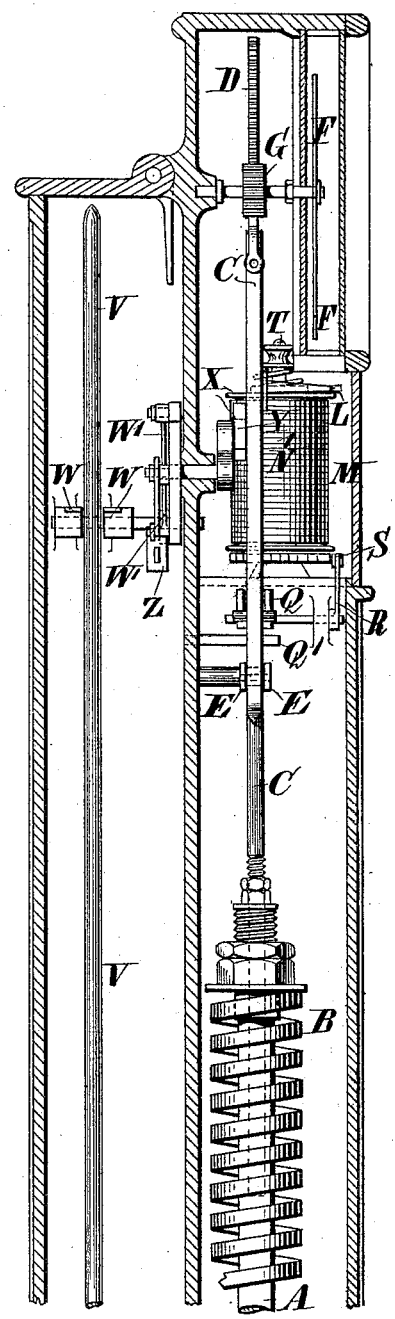
Witnesses:
E. B. Bolton
H. van Oldenneel
Inventors:
Edward Henry Beckett
Charles Warren Roberts
By Richard ... their Attorneys.

(No Model.) 2 Sheets—Sheet 2.

E. H. BECKETT & C. W. ROBERTS.
AUTOMATIC WEIGHING MACHINE.

No. 527,828. Patented Oct. 23, 1894.

Witnesses:
E. B. Bolton
H. van Oldenneel

Inventors:
Edward Henry Beckett
Charles Warren Roberts
By Richards
their Attorneys.

THE NORRIS PETERS CO., PHOTO-LITHO., WASHINGTON, D. C.

UNITED STATES PATENT OFFICE.

EDWARD HENRY BECKETT, OF GLAN-EU-LAN, TAN-Y-GRISIAU, AND CHARLES WARREN ROBERTS, OF PLAS WEUNYDD, BLAENAU-FESTINIOG, ENGLAND.

AUTOMATIC WEIGHING-MACHINE.

SPECIFICATION forming part of Letters Patent No. 527,828, dated October 23, 1894.

Application filed January 11, 1894. Serial No. 496,480. (No model.) Patented in England January 31, 1893, No. 2,100.

*To all whom it may concern:*

Be it known that we, EDWARD HENRY BECKETT, residing at Glan-eu-lan, Tan-y-grisiau, and CHARLES WARREN ROBERTS, residing at Plas Weunydd, Blaenau-Festiniog, North Wales, England, subjects of the Queen of Great Britain, have invented new and useful Improvements in Automatic Weighing Machines, (patented in Great Britain January 31, 1893, No. 2,100,) of which the following is a specification.

This invention has for its object the construction of a weighing machine in or by which the weighing of the articles is shown on a dial, a record of the number of weighings made and the respective weights in addition to a checking system by which the person weighing the goods or articles can be identified supposing several persons had access or be told off to do the weighing, there being no indication of weight or movement of the indicating mechanism until an appliance such as a token or tally of special kind be put into the machine to serve for moving a balance and freeing itself, the movement of the balance disengaging a locking device before the weighing and recording can take place. The recording is by marking paper which moves a stage at each weighing.

As an example of the utility of our invention, supposing six persons in a wharf or factory had the power to weigh and deliver goods we provide each of the six persons with metal tickets specially marked or numbered by which they would be known. Now say No. 3 conducts a weighing. He, after placing the goods upon the machine platform inserts a No. 3 ticket. This by dropping on certain levers releases the locking device and the weighing, the recording and the numbering appliances are set free to act accordingly. The same operations are brought about after any other ticket is inserted and so on. The order of the tickets found in the machine corresponds to the recording chart. Thus a complete and perfect system of checking is established, the only duty performed by the weigher being to drop a ticket in and the machine does the rest.

The invention will be clearly understood by reference to the annexed drawings, in which—

Figure 4:
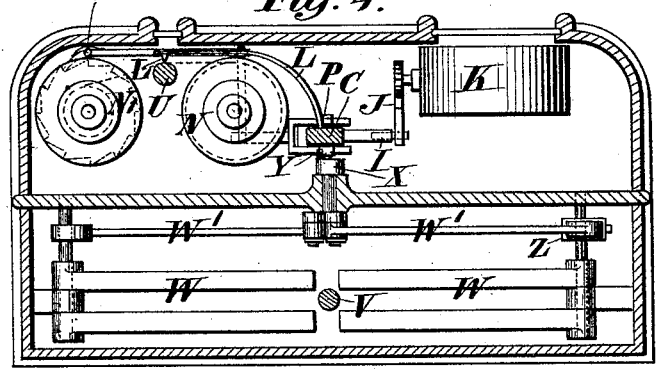

Figure 1 is a front sectional elevation; Fig. 2, a side sectional elevation; Fig. 3, a sectional elevation from the back of the upper frame, and Fig. 4, a plan on the line *a, a,* of Fig. 3.

As represented on the drawings the machine is supposed to be of the usual platform kind with a rod A and spring B for compression by the weight of the goods the upper mechanism remaining fixed until the token or tally has been put into the frame and upon a rod V or tube, or receiver chamber. The token or coin may be introduced into the machine by raising the small door at the top of the rod V. Shown in Fig. 2.

The upper end of the rod A is hollow for a given distance for the lower end of a second rod C to move in to the distance of the spring's compression. The rod C has at its upper part a rack D and is guided for vertical motion by the rollers E, E, the rack D being used for operating the finger F by the pinion G to indicate the weight in the well known manner. The rack D by its arms I and links J causes the index K to register the number of weighings in succession, said index mechanism being inclosed in a casing but visible through a glass.

The rod C carries a pointer L with a pencil or marker projecting therefrom to descend with the rod C and bear against and mark the surface of paper M secured to two reels N, N, from one of which the paper can be drawn and taken up by the other at each uprising motion of the rod C by the stud pin P pressing up the arm Q which otherwise rests on it. The stop Q' prevents the arm Q descending more than is required for the pawl S to engage in the next tooth in order that the pencil in returning goes back over a greater part of the same mark it made in its descent.

The arm Q is pivoted at R to operate the pawl S for pushing the reel N' forward a stage to bring a fresh part of the paper in line with the marking pencil. The reels N, N', are held in tension by the springs and pinch nuts T, T, the previous marking on the paper having been moved clear of the sight glass which is in front, though the marking when done can be seen by the person weighing the goods and before removing them from the scale platform there being a rigid backing U to insure the prominent marking on the paper.

The horizontal line markings on the paper are graduated to represent given weights and the distance the pencil travels vertically across these lines will indicate the weights, the margin of the paper being marked to correspond to a scale of markings exposed to the man weighing or receiving the goods, said scale being next a facing glass behind which the pencil moves. The number of vertical pencil lines will indicate the number of weighings when the tape paper is removed but by the index or counter K the total weighings over a given period can be seen.

The lever Q follows the rod C until it rests upon the stop Q' drawing the pawl S into a fresh tooth of the reel N' ready for moving the paper over at the next up motion of the rod C, this being effected by the rise of the platform and rod A when the weighed goods have been lifted or removed from the scale platform. As soon as the tally has depressed the levers W, W', it passes clear and allows the levers W, W' to return to their normal positions under the action of the weight Z so that the stop or catch X moves into position for re-engaging under the block Y when the rod C returns consequent upon the removal of the weight from the platform.

What we do claim, and desire to secure by Letters Patent, is—

1. In combination in a weighing machine, the casing, the vertically movable rod C, the coin freed devices for controlling said rod, the marker connected with the rod to move therewith, and the paper holding means adapted to maintain the paper in proper position for receiving the markings, substantially as described.

2. In combination, in a weighing machine the casing, the vertically movable rod C, the coin freed devices for controlling the same, the marker carried by the said rod, the paper reels, and the operating connections extending from and operated by the rod C, substantially as described.

3. In combination, in a weighing machine, the casing, the vertically movable rod C, the marker carried thereby, the paper reels, the means for moving the same from the rod C, the coin freed devices controlling the rod C and the dial mechanism operated by the rod C, substantially as described.

In witness whereof we have hereto signed our names this 2d day of December, 1893.

EDWARD HENRY BECKETT.
CHARLES WARREN ROBERTS.

Witnesses:
RICHARD JONES,
*Brynmarian, Blaenau-Festiniog, N. W.*
DAVID RICHARDS,
*The Vicarage, Blaenau-Festiniog, North Wales.*